US009483753B2

(12) United States Patent
Thiruvidam et al.

(10) Patent No.: US 9,483,753 B2
(45) Date of Patent: Nov. 1, 2016

(54) INTEGRATING DOCUMENT RELATED COMMUNICATION WITH A DOCUMENT

(71) Applicant: Hewlett-Packard Development Company, L.P., Houston, TX (US)

(72) Inventors: Eniyan Thiruvidam, Bangalore (IN); Anjaneyulu Seetha Rama Kuchibhotla, Bangalore (IN); Ninoj Antony, Bangalore (IN); Siddharth Kalita, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 324 days.

(21) Appl. No.: 13/791,092

(22) Filed: Mar. 8, 2013

(65) Prior Publication Data

US 2014/0195885 A1    Jul. 10, 2014

(30) Foreign Application Priority Data

Jan. 5, 2013   (IN) ................ 53/CHE/2013

(51) Int. Cl.
*G06F 17/22*    (2006.01)
*G06Q 10/10*    (2012.01)

(52) U.S. Cl.
CPC .................. *G06Q 10/10* (2013.01)

(58) Field of Classification Search
CPC ................................. G06F 17/2235
USPC ........................................... 715/205
See application file for complete search history.

(56) References Cited

U.S. PATENT DOCUMENTS

| | | | |
|---|---|---|---|
| 6,438,564 B1 * | 8/2002 | Morton et al. ................ 715/206 | |
| 7,086,003 B2 | 8/2006 | Demsky et al. | |
| 7,089,278 B1 * | 8/2006 | Churchill et al. ............ 709/203 | |
| 7,269,787 B2 * | 9/2007 | Amitay ................ G06F 17/241 | 345/173 |
| 7,982,898 B2 | 7/2011 | Lapstun et al. | |
| 2004/0250201 A1 * | 12/2004 | Caspi ..................... G06Q 10/10 | 715/233 |
| 2006/0010396 A1 * | 1/2006 | Beezer ................. G06F 17/241 | 715/802 |
| 2006/0143558 A1 * | 6/2006 | Albornoz ............. G06F 3/0483 | 715/205 |
| 2006/0282762 A1 * | 12/2006 | Diamond ............. G06F 17/241 | 715/235 |
| 2007/0055926 A1 * | 3/2007 | Christiansen ........ G06F 17/241 | 715/210 |
| 2007/0118794 A1 * | 5/2007 | Hollander ............ G06F 17/241 | 715/205 |
| 2007/0271502 A1 * | 11/2007 | Bedi ..................... G06F 17/248 | 715/230 |
| 2008/0052634 A1 * | 2/2008 | Fishkin ............ G06F 17/30899 | 715/753 |
| 2008/0177537 A1 * | 7/2008 | Ash ....................... G06F 19/322 | 704/235 |

(Continued)

OTHER PUBLICATIONS

Churchill, Elizabeth F., Jonathan Trevor, Sara Bly, Les Nelson, and Davor Cubranic. "Anchored conversations: chatting in the context of a document." in Proceedings of the SIGCHI conference on Human Factors in Computing Systems, pp. 454-461. ACM, 2000.*
Parr, Ben, "Google Wave: A Complete Guide", Download Date: Dec. 24, 2012, <http://mashable.com/2009/05128/google-wave-guide/>.

(Continued)

*Primary Examiner* — Frank D Mills
(74) *Attorney, Agent, or Firm* — HP Inc Patent Department (57) ABSTRACT

Provided is a method of integrating a document related communication with a document. A communication interface is provided for a user to establish a document related communication with another user. The document related communication with another user is recorded and a link to the recorded document related communication with another user is provided with the document.

20 Claims, 4 Drawing Sheets

(56) References Cited

U.S. PATENT DOCUMENTS

| | | | | |
|---|---|---|---|---|
| 2008/0215323 | A1* | 9/2008 | Shaffer | H04M 3/5335 704/246 |
| 2009/0044132 | A1* | 2/2009 | Combel et al. | 715/753 |
| 2009/0094537 | A1* | 4/2009 | Alber | 715/758 |
| 2009/0217196 | A1* | 8/2009 | Neff | G06Q 10/10 715/799 |
| 2011/0099006 | A1* | 4/2011 | Sundararaman et al. | 704/208 |
| 2011/0154176 | A1 | 6/2011 | Inui et al. | |
| 2011/0154180 | A1* | 6/2011 | Evanitsky | G06F 17/241 715/233 |
| 2011/0161792 | A1 | 6/2011 | Florence et al. | |
| 2012/0036423 | A1* | 2/2012 | Haynes, II | G06F 17/241 715/230 |
| 2012/0158864 | A1* | 6/2012 | Schindler et al. | 709/206 |
| 2012/0215686 | A1 | 8/2012 | Lauzon | |
| 2012/0253492 | A1* | 10/2012 | Andrews | H04W 4/021 700/94 |
| 2012/0284618 | A1* | 11/2012 | Bailor et al. | 715/255 |
| 2012/0304079 | A1* | 11/2012 | Rideout et al. | 715/758 |
| 2013/0091419 | A1* | 4/2013 | Caliman | G06F 17/241 715/236 |
| 2013/0159830 | A1* | 6/2013 | Lee et al. | 715/208 |
| 2014/0033068 | A1* | 1/2014 | Gupta | G06Q 10/103 715/751 |
| 2015/0200893 | A1* | 7/2015 | Harris | G06Q 10/101 709/206 |

OTHER PUBLICATIONS

Pirri, Franco, et al., "InterDataNet: Interoperability Framework to Support Collaborative Creation and Management of Official Documents in e-Government Processes", Proceedings of the 41st Hawaii International Conference on System Sciences 2008, Jan. 2008.

Barb Dybwad, "9 Great Document Collaboration Tools for Teams," Dec. 20, 2009, (web page), <http://mashable.com/2009/12/20/document-collaboration/>.

ITS Online, "#91 View your Lync Conversation History in Outlook," Dec. 9, 2011, (web page), <https://www.law.upenn.edu/live/news/2324-91-view-your-lync-conversation-history-in-outlook/its/news.php>.

MD et al., "onenote 2010—how to paste a web page and have access to source link," (web forum), Nov. 10-12, 2010, <https://social.technet.microsoft.com/Forums/office/en-US/da80c0lb-4e94-449d-bcbd-44df1b4eee2e/onenote-2010-how-to-paste-a-web-page-and-have-access-to-source-link?forum=officeitproprevious>.

PeteK01 et al., "What content is saved to Conversation History folder?," Dec. 30, 2014, (web page), <https://social.technet.microsoft.com/Forums/office/en-US/991745a2-9429-41c4-a88f-e500aea06ee5/what-content-is-saved-to-conversation-history-folder?forum=ocsclients>.

Syracuse University, "Conversation Histories in Lync," Jan. 8, 2013, (web page), <https://answers.syr.edu/display/software/Conversation+Histories+in+Lync>.

* cited by examiner

INTEGRATING DOCUMENT RELATED COMMUNICATION WITH A DOCUMENT

CLAIM FOR PRIORITY

The present application claims priority under 35 U.S.C. 119(a)-(d) to Indian Patent application number 53/CHE/2013, filed on Jan. 5, 2013, which is incorporated by reference herein in its entirety.

BACKGROUND

People create a lot of content in collaboration with others. Generally, in an enterprise environment, document creation or review is a collaborative exercise involving a number of users. For example, prior to creating a company's website a number of inputs might be obtained from different individuals regarding the content of a web page. These could include people from various teams such as human resources, sales, marketing, finance, legal, information technology, etc. Another example of a document that typically requires collaborative work is an RFP (request for proposal). Collaboration on aforementioned kind of documents may require numerous rounds of discussions which may involve various modes of communication such as voice calls, text chats, video conferencing, etc.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

There could be a number of situations where a document creator or reviewer might need to collaborate with an individual(s) during the lifecycle of a document. If collaborating individuals are not co-located, one of them may have to use a communication mode to communicate with other individual(s). Depending on convenience or preference, a communication may take place by way of a phone call, a chat message, a video conference, and the like. For example, while creating a response document to an RFP, numerous discussions and/or decisions may be made through different channels of communication such as chat, phone calls etc. Unless documented, such communications are lost forever; the final decision as reflected in the document will be known but not why that decision was made. As a result, for instance, the reasons for any decisions made during a communication may only remain known to persons who were involved in said communication. In fact with the passage of time the original participants may also forget the context behind a particular approach or stance taken during the creation or review of a document.

Presently, a communication related to a document may be stored and managed separately (from the document). Such an approach may not only entail additional costs, but could also result in a scenario wherein a document may get delinked or separated from a related communication. For example, a chat discussion related to a document may get stored on a medium (example, a web server) other than the document storage medium (example, an external server). This could lead to a situation wherein it would be difficult (if not impossible) for an individual to trace back a particular content of a document (for example, a clause in a contract) to a related communication.

Proposed is a solution that provides a method of integrating a document related communication with a document. Proposed solution allows an individual to use a document as a central artifact for collaboration but with links to other forms of communication that have influenced its contents. It captures critical information and makes it available over the entire lifecycle of a document. The communication is tagged with several pieces of information such as who were the collaborators involved in that communication, when did it take place, a potential subject for that communication, etc.

For the sake of clarity, the term "document" in this document may include anything serving as a representation of a person's thinking by means of symbolic marks. In computer science terminology, it may include a computer file that contains text (and possibly formatting instructions) using seven-bit ASCII characters. The said term includes an electronic document as well. To provide some non-limiting examples, said term may include a text, an image, an illustration, a diagram, etc.

Figure 1:
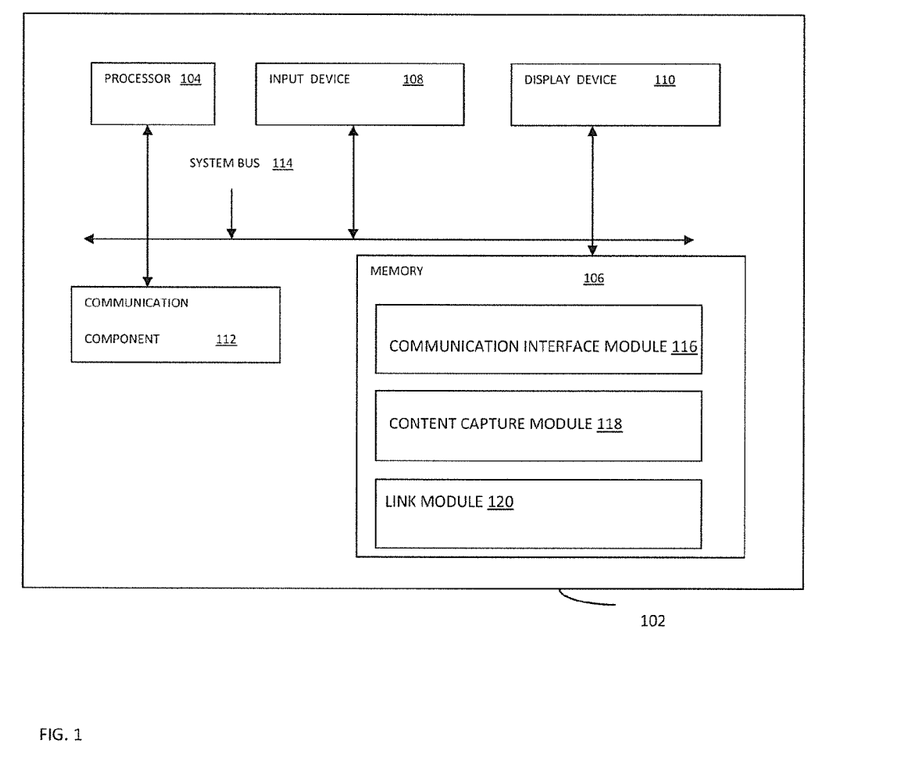
FIG. 1 shows a block diagram of a computer system for implementing a method of integrating a document related communication with a document, according to an example.

FIG. 1 shows a block diagram of a computer system for integrating a document related communication with a document, according to an example.

Computer system 102 may be a computer server, desktop computer, notebook computer, tablet computer, mobile phone, personal digital assistant (PDA), and the like.

Computer system 102 may include processor 104, memory 106, input device 108, display device 110, and a communication interface 112. The components of the computing system 102 may be coupled together through a system bus 114.

Processor 104 may include any type of processor, microprocessor, or processing logic that interprets and executes instructions.

Memory 106 may include a random access memory (RAM) or another type of dynamic storage device that may store information and instructions non-transitorily for execution by processor 104. For example, memory 106 can be SDRAM (Synchronous DRAM), DDR (Double Data Rate SDRAM), Rambus DRAM (RDRAM), Rambus RAM, etc. or storage memory media, such as, a floppy disk, a hard disk, a CD-ROM, a DVD, a pen drive, etc. Memory 106 may include instructions that when executed by processor 104 implements communication interface module 116, content capture module 118, and/or link module 120.

Communication interface module 116 enables a user to establish a communication with another user through communication interface 112. In an implementation, such communication may pertain to a document and include, for instance, a discussion related to its contents. Some non-limiting examples of a communication interface module 116 may include a chat application, a voice chat application, a video conferencing application, an image sharing application, a data file sharing application, or any combination thereof. Therefore, communication interface module 116 may enable a communication which could be in the form of chat or instant messages, a voice call, a video interaction, sharing of a document or data file, or any combination thereof.

Content capture module 118 records a communication between two users or a plurality of users. In an implementation, a communication between two users or a plurality of users takes place through communication interface module 116. A recording of a communication between users may be saved in a database which may be present on computer system 102 or a remote computer system (or computer server) coupled to computer system 102 through wired or wireless means. In an implementation, aforesaid database archives a communication between users for future reference. Alternatively the communication can be stored in separate files and the links to those files can be preserved in the document.

Link module 120 generates a link between a recorded communication and a document. In other words, it creates an association or a connection between a recorded communication and a document. In an implementation, the recorded communication pertains to a document and include, for instance, a discussion related to its contents between two or more users. Logically link module 120 maintains the links embedded in the document. However, in an implementation, the links could also be maintained external to the document but with references to the specific parts of the document they are associated with and overlaid at the time of document editing. This enables the system to deal with third party document creation/editing tools to support the functionality illustrated in this document. The link module may also be able to associate permissions with the different links i.e. some links may be accessible only to some users based on either their role or their identity.

Communication interface module 116, content capture module 118 and link module 120 may be implemented in the form of a computer program product including computer-executable instructions, such as program code, which may be run on any suitable computing environment in conjunction with a suitable operating system, such as Microsoft Windows, Linux or UNIX operating system. In an implementation, communication interface module 116, content capture module 118, and link module 120 may be read into memory 106 from another computer-readable medium, such as data storage device, or from another device via communication interface 112.

Input device 108 may include a keyboard, a mouse, a touch-screen, or other input device. Display device 110 may include a liquid crystal display (LCD), a light-emitting diode (LED) display, a plasma display panel, a television, a computer monitor, and the like.

Communication component 112 may include any transceiver-like mechanism that enables computing device 102 to communicate with other devices and/or systems via a communication link. Communication component 112 may be a software program, hardware, firmware, or any combination thereof. Communication component 112 may provide communication through the use of either or both physical and wireless communication links. To provide a few non-limiting examples, communication component 112 may be an Ethernet card, a modem, an integrated services digital network ("ISDN") card, etc.

It would be appreciated that the system components depicted in FIG. 1 are for the purpose of illustration only and the actual components may vary depending on the computing system and architecture deployed for implementation of the present solution. The various components described above may be hosted on a single computing system or multiple computer systems, including servers, connected together through suitable means.

Figure 2:
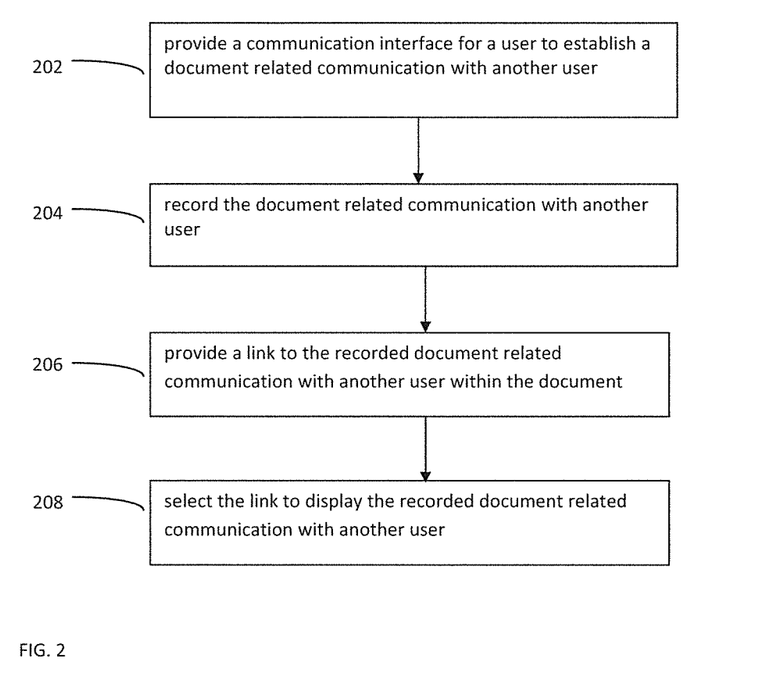
FIG. 2 illustrates a flow chart of a method of integrating a document related communication with a document, according to an example.

FIG. 2 illustrates a flow chart of a method of integrating document related communication with a document, according to an example. At block 202, a communication interface is provided on a computer system for a user to establish a communication with another user. In an implementation, said communication relates to a document. Also, in an implementation, a communication interface comprises a communication interface module which enables a user to establish a communication with another user over a network (wired or wireless). Some non-limiting examples of a communication interface may include a chat application, a voice chat application, a video conferencing application, an image sharing application, a data file sharing application, or any combination thereof. Therefore, a communication interface enables a communication between two or more users which could be in the form of chat or instant messages, a voice call, a video interaction, sharing of a document or data file, or any combination thereof.

As mentioned earlier, a communication facilitated by a communication interface may pertain to a document. In an implementation, a communication may relate to the contents of a document. To provide an example, let's consider a scenario wherein a user is creating a document using a word processing application such as Microsoft Word. While working on the document, the user may wish to discuss some aspect of its contents with another individual (another user). In such a scenario, the user may use a communication interface present on his computer system to establish a communication with another individual over a wired or wireless network. A user may use any of the aforementioned communication interfaces such as an instant messaging application, a voice chat application, a video conferencing application, etc. to initiate and engage in conversation with another user. By this way, a user could solicit another user's comments, feedback, remarks, inputs, etc. related to the contents of a document under discussion. Such feedback or comments may result in a change in the document contents.

At block 204, a communication between two or more users is recorded. In an implementation, a recorded communication relates to a document. In other words, a communication between two or more users established using a communication interface and pertaining to the contents of a document is recorded. To provide an example, if a user engages in a communication with another user to discuss the contents of a document, for example by using an instant messaging application, then contents of such communication are recorded.

A recording of a communication between users is saved in a database which may be present on a user's computer system or a remote computer system (or computer server) coupled to a user's computer system through wired or wireless means. In this manner, an archive of all recorded conversations (pertaining to contents of a document) between users may be built for future reference. A recorded conversation could be a text file, an audio file, a video file, a multimedia file, or any file format for that matter.

In an implementation, a document related communication between users is saved within a data file containing the document. In another implementation, a document related communication between users may be saved in a data file distinct from a data file containing the document.

At block 206, a link (or hyperlink) to a recorded communication between two or more users is provided with a document. In an implementation, a link to a recorded communication between two or more individuals is inserted within a document. In another implementation, however, aforesaid link may be maintained external to a document. A recorded communication between two or more users may pertain to the contents of a document and may include, for instance, a text communication, an audio communication, a video communication, and the like. To provide an example, if a recorded communication is a video communication (stored in a video file format) then a link to said video file may be inserted within the document. In another example, if a recorded communication is an instant message communication (stored in an appropriate text file) then a link to said text file may be maintained external to a document with reference to the specific part of the document it is associated with. In either manner, all recorded communications between two or more individuals pertaining to a document could be linked to the contents of said document. It may be noted that a distinct link is provided for each recorded communication related to a document.

Figure 3:
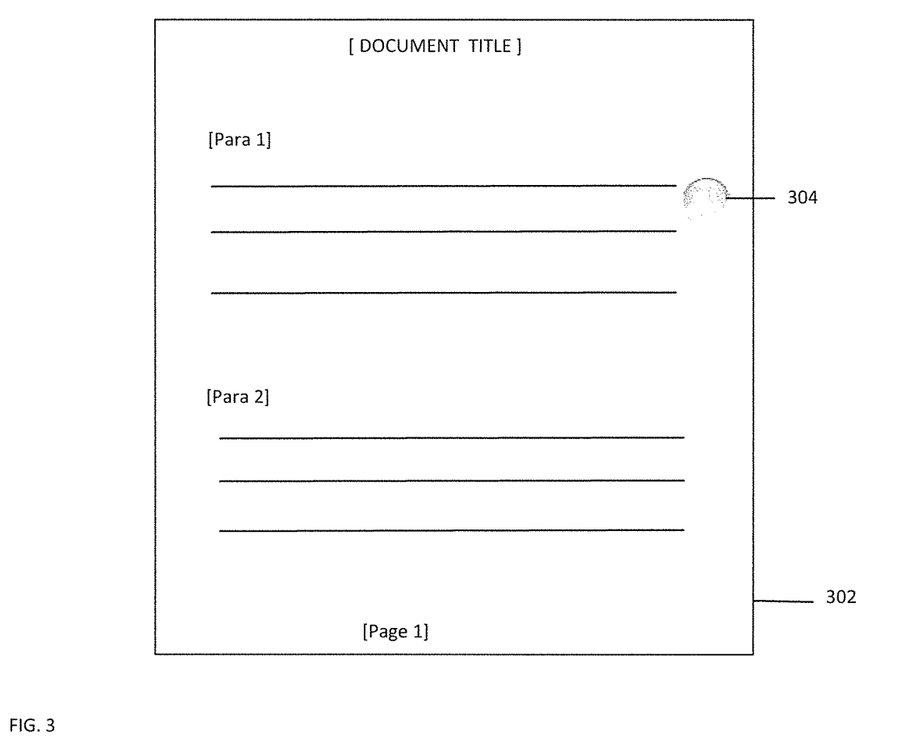
FIG. 3 illustrates a Graphical User Interface (GUI) element representing a link between a document related recorded communication and a document, according to an example.

In an implementation, a link to a recorded communication is provided in the form of a Graphical User Interface (GUI) element, such as an icon. In such case, each icon represents a link (hyperlink) to a recorded communication. This is illustrated in FIG. 3, wherein a link to a recorded video communication is placed within a document 302 in the form of an icon 304. In an implementation, location of an icon (indicating a link to a recorded communication) in a document may depend on a user of the document. For example, once a document related communication is recorded, a user may indicate his preference of placing a link (to the recorded communication) by positioning or pointing a cursor at a preferred area within the document. In another scenario, if an icon is automatically generated, a user could move the icon to a section of his choice within a document. Thus, a communication may be tagged implicitly or explicitly (based on user inputs) before being saved. Positioning a link as a GUI element within a document helps a new user recognize an earlier document related communication.

Figure 4:
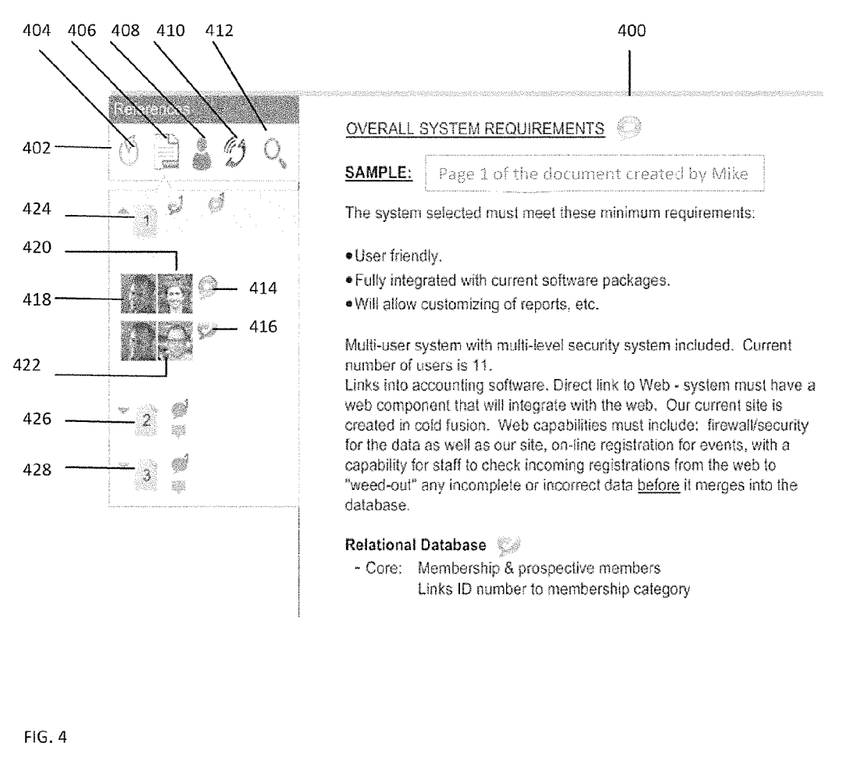
FIG. 4 illustrates a Graphical User Interface (GUI) element representing an organized arrangement of links between document related recorded communications and a document, according to an example.

In an implementation, links to recorded communications relevant to a document may be organized in the form of a Graphical User Interface (GUI) element, such as a navigation panel. For example, if icons are used to represent links to recorded communications then such icons could form part of a navigation panel. This is illustrated in FIG. 4, which depicts a navigation panel 402. Navigation panel 402 helps collate links to all recorded communication at one location. For instance, in the present illustration, navigation panel 402 provides a number of options to organize all recorded communications related to a document. These options could include sorting of recorded communications based on a timeline 404, sorting of recorded communications based on their association with a page of a document 406, sorting of recorded communications based on an individual (for instance, all communications with an individual) 408, sorting of recorded communications based on type of communication (for example, audio, video, etc.) 410, and sorting of recorded communications based on a search terminology or a tag 412. The aforementioned options are for the purpose of illustration only and recorded communications could be organized and searched in a number of other ways as well.

In another implementation, links to recorded communications relevant to a document may be organized based on relevance of a communication to a section of the document. Said section could be a page of the document, a paragraph of the document, a line in the document, a word in the document, an illustration in the document, and the like. In other words, links to recorded communications relevant to a document could be anchored to any portion of a document. In an implementation, such anchoring reflects the relevance of a communication to a section of the document. For example, let's assume that there are seven recorded video communications relevant to a document. In such case, two of them may be associated with page 1 of the document 424, one with page 2 of the document 426, and the remaining four with page 3 of the document 428. Once the links to recorded communications associated with a document are organized in a particular format, they are saved along with the document. And upon subsequent review, the links are presented accordingly to a user.

Referring to FIG. 4, navigation panel 402 illustrates links to recorded communications that have occurred corresponding to each page of a document 400. Icons 414 and 416 which form part of navigation panel 402 are used to represent links to recorded communications. Icons 414 and 416 represent a recorded video and audio communication respectively. A user can navigate a document and based on the page number of a document links to recorded communications (icons) are displayed for the corresponding page. In another implementation, a user can navigate this panel and synchronously the panel could get updated to reflect the corresponding page's information.

In an implementation, identification details of a user involved in a recorded communication may be displayed as part of a Graphical User Interface (GUI) used to organize links to recorded communications relevant to a document. The identification details of a user could include, by way of example, a photograph of a user, email address, phone number, chat ID, etc. The identification details of a user(s) could be displayed along with link to a recorded communication involving the user(s). To provide an example, in the context of FIG. 4, let's assume that the creator of the document 400 is a user called Mike 418. In the present case, Mike 418 engages in two document-related communications with users Lisa 420 and Chris 422. One communication is a video conference with Lisa 420 and the other communication is a voice call with Chris 422. Both these communications are recorded and individual links are created for each communication. In FIG. 4, these links are illustrated in the form of a video icon 414 and a call icon 416, respectively.

As mentioned earlier, once the links to recorded communications associated with a document are organized in a particular format, they are saved accordingly along with the document. Upon a further review of the document, the links are displayed along with contents of the document. At block 208, selection of a link displays an associated recorded communication. In an implementation, selection of a link within a document displays a document related recorded communication with another user. For example, in the context of FIG. 4, if a user selects video icon 414, he will be able to see the video corresponding to the call Mike had with Lisa. If a user selects call icon 416, he will be able to hear the call between Mike and Chris.

The aforementioned implementations provide a mechanism to store a document along with a communication that may have influenced its contents. It captures critical information related to the contents of a document and makes it available over its entire lifecycle.

It will be appreciated that the embodiments within the scope of the present solution may be implemented in the form of a computer program product including computer-executable instructions, such as program code, which may be run on any suitable computing environment in conjunction with a suitable operating system, such as Microsoft Windows, Linux or UNIX operating system etc. Embodiments within the scope of the present solution may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

For the sake of clarity, the term "module", as used in this document, may mean to include a software component, a hardware component or a combination thereof. A module may include, by way of example, components, such as software components, processes, tasks, co-routines, functions, attributes, procedures, drivers, firmware, data, databases, data structures, Application Specific Integrated Circuits (ASIC) and other computing devices. The module may reside on a volatile or non-volatile storage medium and configured to interact with a processor of a computer system.

It should be noted that the above-described embodiment of the present solution is for the purpose of illustration only. Although the solution has been described in conjunction with a specific embodiment thereof, numerous modifications are possible without materially departing from the teachings and advantages of the subject matter described herein. Other substitutions, modifications and changes may be made without departing from the spirit of the present solution.

We claim:

1. A method of integrating a document related communication with a document, comprising:
    providing communication interfaces to establish a plurality of different types of communications;
    storing document related communications, performed via the communication interfaces, within a data file containing the document, wherein the document related communications are comprised of the plurality of different types of communications;
    providing, in the document, a plurality of links, wherein each link of the plurality of links is to a document related communication of the document related communications;
    providing a navigation panel in a graphical user interface (GUI), and the navigation panel includes the plurality of links in a form of GUI elements; and
    sorting the plurality of links in the navigation panel according to the plurality of different types of communications for the document related communications.

2. The method of claim 1, further comprising displaying one of the document related communications upon selection of the link of the one of the document related communications.

3. The method of claim 1, wherein the communication interfaces, for a user to establish the document related communications are provided within an application used for creating and/or reviewing the document.

4. The method of claim 1, wherein the communication interfaces are external to an application used for creating and/or reviewing the document.

5. The method of claim 1, wherein the communication interfaces comprise a plurality of a chat application, a voice chat application, a video conferencing application, an image sharing application, and a data file sharing application.

6. The method of claim 1, wherein the document related communications comprise a plurality of a chat, an audio, a video, an image, a document, a data file, or any combination thereof.

7. The method of claim 1, further comprising additionally storing the document related communications in a data file distinct from the data file containing the document.

8. The method of claim 1, wherein locations of the plurality of links are determined by the user.

9. The method of claim 1, wherein locations of the plurality of links are based on relevance to a section of the document.

10. The method of claim 9, wherein the section includes one of the following: a page in the document, a paragraph in the document, a line in the document, a word in the document and an illustration in the document.

11. A computer system for integrating document related communications with a document, comprising:
    a processor; and
    communication interfaces to establish a plurality of different types of communications,
    wherein the processor is to:
    store document related communications, performed via the communication interfaces, within a data file containing the document, wherein the document related communications are comprised of the plurality of different types of communications; and
    generate, in the document, a plurality of links to the document related communications, wherein each link of the plurality of links is to a document related communication of the document related communications,
    provide a navigation panel in a graphical user interface (GUI), and the navigation panel includes the plurality of links in a form of GUI elements, and
    sort the plurality of links in the navigation panel according to the plurality of different types of communications for the document related communications.

12. The system of claim 11, further comprising a database to store the document related communications.

13. The system of claim 12, wherein the database is present on the user's computer.

14. The system of claim 11, wherein the GUI elements include identification details of the user and/or the at least one other user.

15. The system of claim 11, further comprising:
    a display device to display the document related communications and the navigation panel.

16. The system of claim 11, wherein the plurality of different types of comprise voice communications, instant messaging communications, and video conferencing communications, and the processor is to:
    display the sorted plurality of links in the navigation panel, wherein the plurality of links associated with the voice communications type are grouped together in the navigation panel according to the sort, the plurality of links associated with the instant messaging communications type are grouped together in the navigation panel according to the sort, and the plurality of links associated with the video conferencing communications type are grouped together in the navigation panel according to the sort.

17. The system of claim 11, wherein to provide the plurality links in the document, the processor is to:

generate an icon for at least one of the stored document related communications, wherein the icon indicates a type of communication for the at least one document related communication;

receive a user preference from at least one of the users for a location in the document for placing the icon; and place the icon at the location.

18. A non-transitory processor readable medium, the non-transitory processor readable medium comprising machine executable instructions, the machine executable instructions when executed by a processor cause the processor to:

provide communication interfaces to establish a plurality of different types of communications;

store document related communications, performed via the communication interfaces, within a data file containing the document, wherein the document related communications are comprised of the plurality of different types of communications;

provide, in the document, a plurality of links, wherein each link of the plurality of links is to a document related communication of the document related communications;

provide a navigation panel in a graphical user interface (GUI), and the navigation panel includes the plurality of links in a form of GUI elements; and sort the plurality of links in the navigation panel according to the plurality of different types of communications for the document related communications.

19. The non-transitory processor readable medium of claim 18, wherein the plurality of different types of communications comprise voice communications, instant messaging communications, and video conferencing communications, and the machine executable instructions to cause the processor to sort the plurality of links, further cause the processor to:

display the sorting plurality of links in the navigation panel, wherein the plurality of links associated with the voice communications type are grouped together in the navigation panel according to the sort, the plurality of links associated with the instant messaging communications type are grouped together in the navigation panel according to the sort, and the plurality of links associated with the video conferencing communications type are grouped together in the navigation panel according to the sort.

20. The non-transitory processor readable medium of claim 18, wherein the machine executable instructions to cause the processor to provide, in the document, the plurality of links further cause the processor to:

generate an icon for at least one of the stored document related communications, wherein the icon indicates a type of communication for the at least one document related communication;

receive a user preference from at least one of the users for a location in the document for placing the icon; and place the icon at the location.

\* \* \* \* \*